United States Patent [19]

Sugiura

[11] Patent Number: 4,518,228
[45] Date of Patent: May 21, 1985

[54] ZOOM LENS
[75] Inventor: Muneharu Sugiura, Kanagawa, Japan
[73] Assignee: Canon Kabushiki Kaisha, Tokyo, Japan
[21] Appl. No.: 541,670
[22] Filed: Oct. 13, 1983
[51] Int. Cl.³ ............ G02B 13/22; G02B 15/18
[52] U.S. Cl. ................... 350/427; 350/415
[58] Field of Search ................. 350/427, 415

[56] References Cited
FOREIGN PATENT DOCUMENTS
57-19709 2/1982 Japan.

Primary Examiner—John K. Corbin
Assistant Examiner—Rebecca D. Gass
Attorney, Agent, or Firm—Toren, McGeady & Stanger

[57] ABSTRACT

An optical system of zoom lens has four lens groups or, from front to rear, a first lens group of positive power for focusing, a second lens group of negative power for variation of the image magnification, a third lens group of negative power for image shift compensation, and a fourth lens group of positive power for forming an image of an object. The fourth lens group has two component lens group, i.e., from front to rear, a first component lens group and a second component lens group. The fourth lens group's first component lens group has five lenses, namely, from front to rear, a biconvex first lens with a strong curvature at its rear surface, a biconvex second lens with its front surface of strong curvature, a third lens of negative power with a strong curvature at its front surface, a fourth lens of positive power with a strong curvature at its front surface, and a fifth lens of positive power with its front surface of strong curvature. The fourth lens group's second component lens group has three lenses, namely, from front to rear, a first lens of negative power with a strong curvature at its rear surface, a biconvex second lens with its rear surface having strong curvature and a biconvex third lens with a strong curvature at its front surface.

2 Claims, 8 Drawing Figures

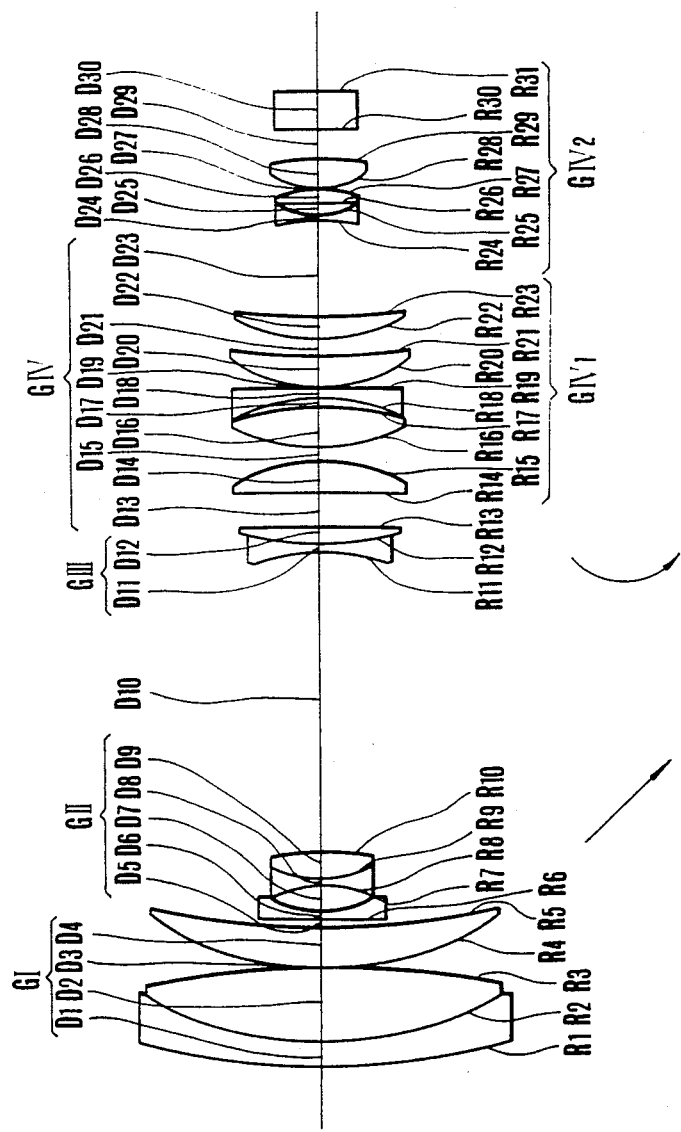

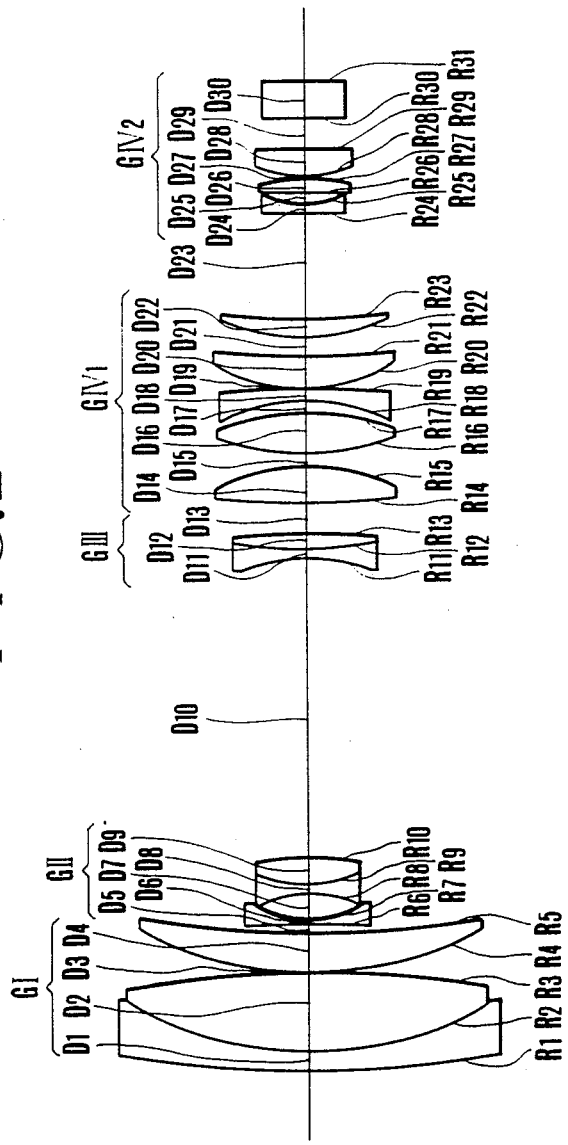

FIG.3(a)
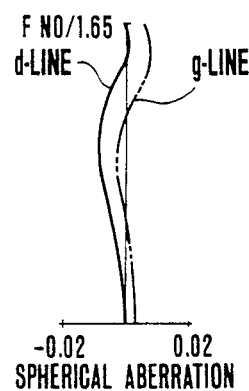
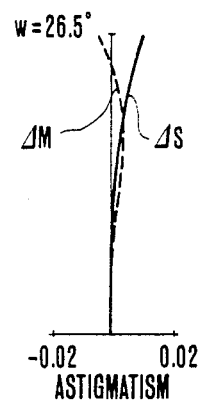
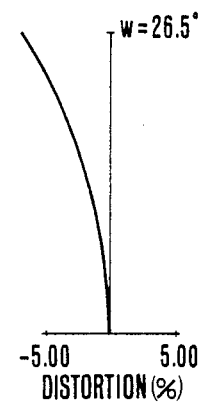
FIG.3(b)
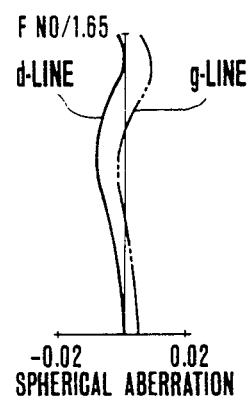
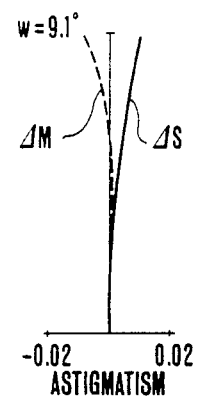
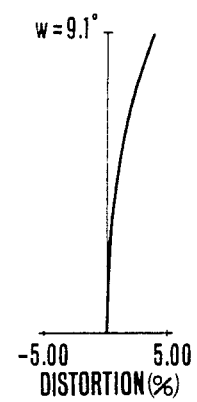
FIG.3(c)
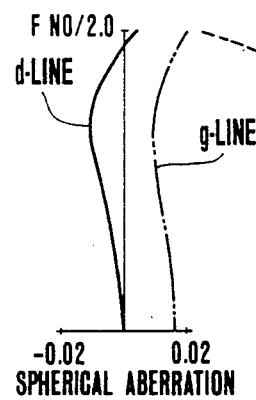
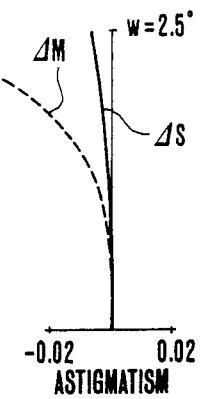
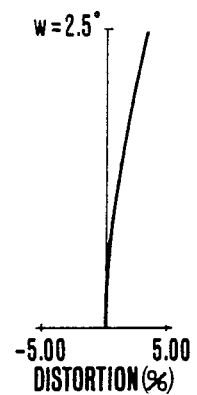

ZOOM LENS

BACKGROUND OF THE INVENTION

1. Field of the Invention

This invention relates zoom lenses and more particularly to a zoom lens comprising, from front to rear, a first component for focusing, a second component of negative power that performs a image magnification varying function, a third component of negative power that serves for image shift compensation and a fourth component of positive power for forming an image.

2. Description of the Prior Art

State of the art of video cameras have been the subjects of great improvements in image sensing and electrical circuit techniques, and presently available image pick-up tubes have excellent image response characteristics in areas such as resolving power and color balance. Such advances create a demand for a zoom lens of reduced size, light weight and high relative aperture with a large zoom ratio usable with many video cameras. Also, single-tube color cameras of the phase separation type and the three-electrode type require that the optical system be constructed in telecentric form for the purpose of preventing color deviation.

In general, most users desire zoom lenses of small size, light weight and short physical length. An effective measure for shortening the mechanical length is to reduce the total movement of the variator.

It is possible to shorten a four component type of zoom lens with a first component counting from the front for focusing the lens, a second component for variation of the image magnification, a third component for image shift compensation and a fourth component for image formation. Such longitudinal shortening of the lens system is advantageously achieved by increasing the refractive power of the second component with decrease in the total movement thereof.

The increase in the refractive power of the second component, however, calls for strengthening the curvature of each refractive surface of the lens elements constituting the second component. This increase the amount of aberrations produced. Under such circumstances, it is very difficult to stabilize good correction of spherical aberration and marginal coma and field curvature throughout the entire zooming range. Further, in the design of a relay lens system with a limitation in the number of lens elements, it is also very difficult to realize a significant increase in relative aperture and form a telecentric optical system.

A zoom lens suited particularly for video cameras and constructed from four components, or a focusing first component, a magnification varying second component, an image shift compensating third component and an image forming fourth component is disclosed in Japanese Laid-Open Patent Application No. SHO 57-19709 of Feb. 2, 1982.

This conventional zoom lens comprises, from front to rear, a focusing first component of positive power with a focal length f1, a magnification varying second component of negative power with a focal length f2 and axially movable to contribute mainly to a change in the focal length of the entire system, a compensating third component of negative power with a focal length f3 and axially movable to maintain the constant position of the image plane which would be otherwise shifted by the movement of the variator, and a relay lens system that follows said compensator. The relay lens system includes a front part or fourth component of positive power with a focal length f4 and a rear part or fifth component having a focal length f5. The fourth component consists of three convex lens members of which at least the central convex lens member is a doublet with its cemented surface convex toward the rear, and the fifth component consists of one or two convex lens member or members, at least one of which is a doublet with its cemented surface convex towards the front. The relay lens system satisfies the following conditions:

$$1.7 < \left| \frac{R_A}{F_W} \right| < 2.4 \quad (1)$$

$$0.5 < \frac{R_B}{F_W} < 2.0 \quad (2)$$

$$\nu_{AP} - \nu_{AN} > 30 \quad (3)$$

$$\nu_{BP} - \nu_{BN} > 20 \quad (4)$$

$$0.7 < \frac{D}{f5} < 1.5 \quad (5)$$

$$1.0 < \frac{Rc}{Bf} < 5.0 \quad (6)$$

where $R_A$ is the radius of curvature of the cemented surface of the central or doublet lens in the fourth component; $\nu_{AP}$ and $\nu_{AN}$ are the Abbe numbers of a positive and a negative lens constituting said doublet; $R_B$ is the radius of curvature of the cemented surface of the doublet lens in said fifth component; $\nu_{BP}$ and $\nu_{BN}$ are the Abbe numbers of a positive and a negative lens constituting said doublet respectively; $F_W$ is the shortest focal length of the entire lens system; f5 is the focal length of said fifth component; D is the interval between the principal planes of said fourth and said fifth components; Rc is the radius of curvature of the front surface of the positive lens in said fifth component; and Bf is the back focus.

Though the characteristic feature of that zoom lens resides in cemented lenses of the relay optical system, it has been found that the use of the cemented lenses provides unsatisfactory results in the image aberrations and particularly imaging features in terms of field curvature.

SUMMARY OF THE INVENTION

A first object of the present invention is to provide a zoom lens of reduced size and weight with increased relative aperture and zoom ratio, while still permitting good correction of aberrations.

A second object of the present invention is to provide a lens system of the zoom lens configuration as a whole with four constituent lens groups or, from front to rear, a first lens group of positive refractive power for focusing, a second lens group of negative refractive power for varying the image magnification, a third lens group of negative refractive power for compensating for the shift of an image plane resulting from the change of the image magnification, and a fourth lens group of positive refractive power for forming an image of an object, the fourth lens group being divided into two parts, or, from front to rear, a first component lens group and a second component lens group, the first component lens group being constructed with five lenses, or, from front to rear, a first lens of biconvex form with its rear refracting surface of strong curvature, a second lens of biconvex form with its front refracting surface of strong curvature, a third lens of negative refractive power with its front refracting surface of strong curvature, a fourth lens of positive refractive power with its front refracting surface of strong curvature, and a fifth lens of positive refractive power with its front refracting surface of strong curvature, and the second component lens group is constructed with three lenses, or a negative lens, a biconvex lens and a biconvex lens. This makes it possible to achieve improvements over the field curvature over the prior art.

BRIEF DESCRIPTION OF THE DRAWINGS

FIGS. 1 and 2 are longitudinal section views of first and second specific embodiments of zoom lenses according to the present invention.

FIGS. 3(a) to 3(c) and FIGS. 4(a) to 4(c) are graphic representations of the aberrations of the lenses of FIGS. 1 and 2 respectively with the subscripts (a), (b) and (c) referring to the wide angle, intermediate and telephoto positions respectively, symbols d and g designating the spherical aberrations for the spectral d-line and g-line respectively, and ΔS and ΔM designating the sagittal image surface and meridional image surface respectively.

DESCRIPTION OF THE PREFERRED EMBODIMENTS

Figure 4A:
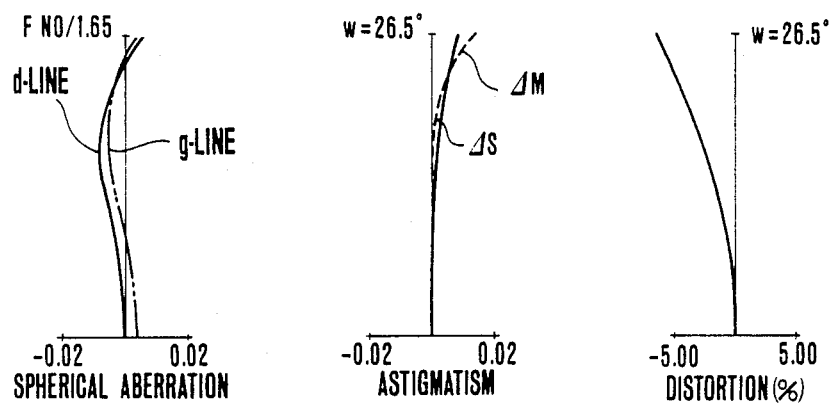
Figure 4B:
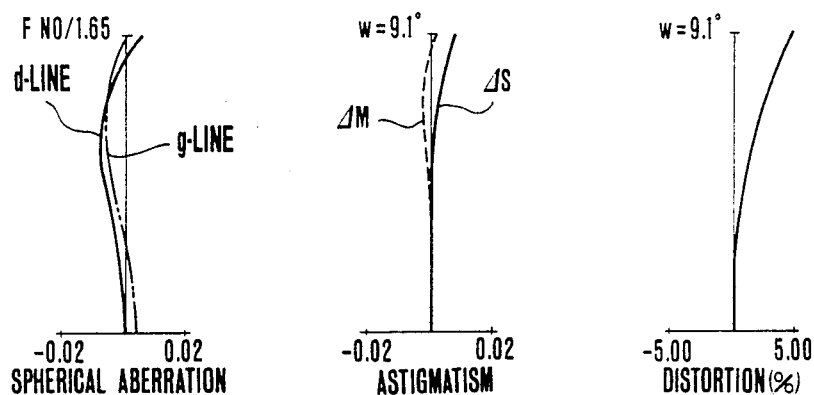
Figure 4C:
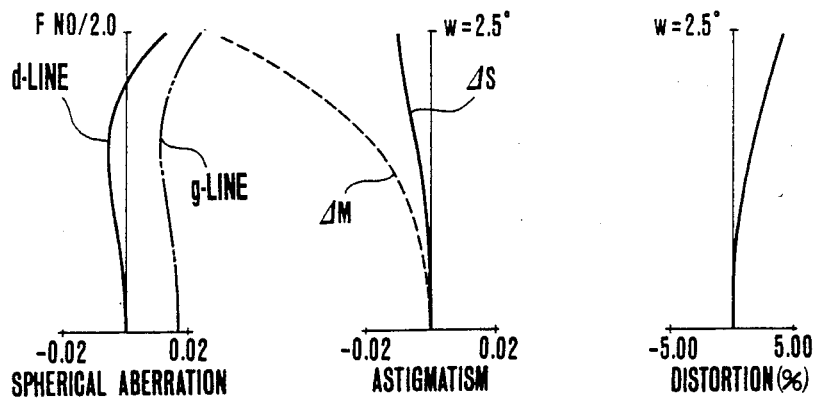

FIGS. 1 and 2 each illustrate the form and construction and arrangement of the lens elements constituting the zoom lens of the present invention. The zoom lens comprises, from front to rear, a first lens group GI of positive refractive power for focusing, a second lens group GII of negative refractive power for the function of varying the image magnification, a third lens group GIII of negative refractive power for compensating for the shift of an image plane resulting from the movement of the second group GII, a fourth lens group GIV of positive refractive power for the function of forming an image of an object. The fourth lens group GIV has two component lens groups, or, from front to rear, a first component lens group GIV-1 and a second component lens group GIV-2. The first component lens group GIV-1 is constructed with five lenses, or, from front to rear, a first lens of biconvex form with its rear refracting surface of strong curvature, a second lens of biconvex form with its front refracting surface of strong curvature, a third lens of negative refractive power with its front refracting surface of strong curvature, a fourth lens of positive refractive power with its front refracting surface of strong curvature and a fifth lens of positive refractive power with its front refracting surface of strong curvature. The second component lens group GIV-2 is constructed with three lenses, or, from front to rear, first lens of negative refractive power with its rear refracting surface of strong curvature, a second lens of positive refractive power in biconvex form with its rear refracting surface of strong curvature, and a third lens of positive refractive power in biconvex form with its front refracting surface of strong curvature. Letting $R_{IVi}$ denote the radius of curvature of the i-th lens surface counting from front in said fourth lens group GIV, $D_{IVi}$ the i-th lens thickness or air separation, and fw the shortest focal length of the entire system of said zoom lens, the following conditions are satisfied:

$$0.9 < |R_{IV3}/R_{IV5}| < 1.9 \text{ (where } R_{IV3} > 0; R_{IV5} < 0) \tag{1}$$

$$2.3 < R_{IV7}/fw < 2.7 \tag{2}$$

$$2.7 < R_{IV9}/fw < 3.1 \tag{3}$$

$$1.1 < R_{IV12}/fw < 1.6 \tag{4}$$

$$0.14 < D_{IV4}/fw < 0.24 \tag{5}$$

$$0.22 < D_{IV8}/fw < 0.27 \tag{6}$$

$$1.4 < D_{IV10}/fw < 1.7 \tag{7}$$

$$0.13 < D_{IV12}/fw < 0.18 \tag{8}$$

Each of the above-stated conditions will be explained below.

Condition (1) serves to appropriately correct spherical aberration. When the upper limit is exceeded, over-correction of the spherical aberration results. When the lower limit is exceeded, under-correction results. Conditions (2) and (3) are to converge the light bundle with good efficiency without having to produce spherical aberration as far as possible. When the upper limit is exceeded, the converging effect is not sufficient, causing the physical length of the lens to be increased. When the lower limit is exceeded, large spherical aberration is produced which is difficult to well correct. Condition (4) is a compromise of the requirements of well correcting coma and of achieving a compact telecentric optical system. When the upper limit is exceeded, the telecentric optical system cannot be formed without sacrificing the reduction of the physical length. When the lower limit is exceeded, large outward coma is produced which is difficult to correct by other lens elements. Condition (5) is to well correct spherical aberration and longitudinal chromatic aberration. When the upper limit is exceeded, large spherical aberration and longitudinal chromatic aberration are produced. When the lower limit is exceeded, astigmatism is objectionably increased. Condition (6) has an effect of converging the light bundle while well correcting spherical aberration. When the upper limit is exceeded, under-correction of spherical aberration results. When the lower limit is exceeded, coma becomes difficult to correct. Condition (7) is to hold an appropriate air separation between the first component and second component lens group and to correct both of on-axis and off-axis aberrations in good balance. When the upper limit is exceeded, spherical aberration and other on-axis aberrations are difficult to correct. When the lower limit is exceeded, off-axis aberrations such as astigmatism and coma becomes difficult to correct. Condition (8) is to construct the telecentric optical system in good form, while simultaneously suppressing all aberrations generally to as low a level as possible. When the upper limit is exceeded, coma, astigmatism and distortion are extremely increased. When the lower limit is exceeded, it becomes difficult to construct the optical system in the telecentric form.

By satisfying all the above-stated conditions, a valuable decrease in the bulk and size and the weight and a valuable increase in the relative aperture and zoom ratio can be achieved while still permitting construction of the optical system in the telecentric form well corrected for aberrations.

Further, in order to facilitate a better accomplishment of the objects of the present invention, it is the first, second and third lens groups are preferably constructed as follows: The first lens group GI is constructed with, from front to rear, a first component lens of positive refractive power with a cemented surface convex toward the front, and a meniscus-shaped second component lens of positive refractive power convex toward the front. Letting $f_T$ denote the longest focal length of the entire lens system, $f_{II}$ the focal length of the second lens group, $f_{III}$ the focal length of the third lens group, and $R_{14}$ and $R_{15}$ the radii of curvature of the front and rear surfaces of the second component lens in the first lens group, the following conditions are satisfied:

$$0.11 < f_{II}/f_T < 0.125 \quad (9)$$

$$0.62 < f_{III}/f_T < 0.70 \quad (10)$$

$$0.29 < R_{14}/R_{15} < 0.34 \quad (11).$$

Each of the above-stated conditions is explained below. Condition (9) concerns with the proportion of the refractive power of the second lens group to that of the entire lens system, and to reduce the size of the entire lens system while maintaining good stability of aberration correction over the entire zooming range. When the upper limit is exceeded, the total length of the lens system is increased. When the lower limit is exceeded, the requirement for the precision accuracy of an operating mechanism for the second and third lens group and particularly of a cam for the variator becomes very rigorous. Condition (10) minimizes the required total movement of the third lens group for the given range of variation of the image magnification, while still permitting the diameter of the front members in the first lens group to be restricted as it is determined by the oblique pencil of light rays at the shorter limit of a focusing range, and to bring the Petzval sum to a positive direction. When the upper limit is exceeded, the lens system is increased not only in the longitudinal direction but also in the lateral direction. When the lower limit is exceeded, the Petzval sum inclines toward the negative direction, and astigmatism becomes difficult to well correct. Condition (11) is a condition for good correction of spherical aberration in the telephoto positions. When the upper limit is exceeded, under-correction of spherical aberration in the telephoto positions results. When the lower limit is exceeded, over-correction of spherical aberration results.

The following show specific numerical examples of the present invention wherein Ri is the radius of curvature of the i-th lens surface counting from front, Di is the i-th lens thickness and air separation counting from front, and Ni and $\nu i$ are the refractive index and Abbe number of the glass of the i-th lens element counting from front respectively, R31 and R32 represent a face plate, filter or the like of the image pick-up tube usable with the video camera.

Also the relationship between the above-stated conditions and the numerical specific examples of the present invention is shown in Table 1.

| Numerical Example 1 | | | |
|---|---|---|---|
| f = 1-11.455 | FNO = 1.65 | Image Angle 2ω = 53°-5° | |
| R1 = 13.417 | D1 = 0.295 | N1 = 1.80518 | ν1 = 25.4 |
| R2 = 5.414 | D2 = 1.182 | N2 = 1.62299 | ν2 = 58.2 |
| R3 = −19.610 | D3 = 0.014 | | |
| R4 = 4.998 | D4 = 0.655 | N3 = 1.62299 | ν3 = 58.2 |
| R5 = 15.746 | D5 = Variable | | |

| -continued | | | |
|---|---|---|---|
| Numerical Example 1 | | | |
| f = 1-11.455 | FNO = 1.65 | Image Angle 2ω = 53°-5° | |
| R6 = 86.608 | D6 = 0.102 | N4 = 1.83400 | ν4 = 37.2 |
| R7 = 1.757 | D7 = 0.382 | | |
| R8 = −2.104 | D8 = 0.091 | N5 = 1.78590 | ν5 = 44.2 |
| R9 = 1.535 | D9 = 0.409 | N6 = 1.84666 | ν6 = 23.9 |
| R10 = −9.745 | D10 = Variable | | |
| R11 = −3.009 | D11 = 0.118 | N7 = 1.71300 | ν7 = 53.8 |
| R12 = 6.306 | D12 = 0.200 | N8 = 1.84666 | ν8 = 23.9 |
| R13 = 568.409 | D13 = Variable | | |
| R14 = 34.608 | D14 = 0.518 | N9 = 1.69680 | ν9 = 55.5 |
| R15 = −2.840 | D15 = 0.227 | | |
| R16 = 3.436 | D16 = 0.582 | N10 = 1.51633 | ν10 = 64.1 |
| R17 = −6.229 | D17 = 0.156 | | |
| R18 = −3.285 | D18 = 0.145 | N11 = 1.84666 | ν11 = 23.9 |
| R19 = 43.521 | D19 = 0.014 | | |
| R20 = 2.332 | D20 = 0.518 | N12 = 1.51633 | ν12 = 64.1 |
| R21 = 12.310 | D21 = 0.266 | | |
| R22 = 2.926 | D22 = 0.300 | N13 = 1.51633 | ν13 = 64.1 |
| R23 = 12.575 | D23 = 1.478 | | |
| R24 = −45.903 | D24 = 0.091 | N14 = 1.88300 | ν14 = 40.8 |
| R25 = 1.256 | D25 = 0.141 | | |
| R26 = 5.339 | D26 = 0.255 | N15 = 1.51742 | ν15 = 52.4 |
| R27 = −2.769 | D27 = 0.014 | | |
| R28 = 1.384 | D28 = 0.455 | N16 = 1.51742 | ν16 = 52.4 |
| R29 = −5.207 | D29 = 0.455 | | |
| R30 = ∞ | D30 = 0.545 | N17 = 1.51633 | ν17 = 64.1 |
| bf (Back Focus) = 0.705 | | Total Length = 15.936 | |
| A stop is positioned at a distance of 0.118 ahead R14. | | | |

| f | 1 | 3.157 | 11.455 |
|---|---|---|---|
| D5 | 0.110 | 2.837 | 4.358 |
| D10 | 4.629 | 1.332 | 0.352 |
| D13 | 0.543 | 1.112 | 0.571 |

An exit pupil lies at −15.652 as measured from the image plane.

R30 and R31 define a dummy glass block corresponding to a face plate, low pass filter, or near infrared cut filter. The same applies unless otherwise specified.

| Numerical Example 2 | | | |
|---|---|---|---|
| f = 1-11.455 | FNO = 1.65 | Image Angle 2ω = 53°-5° | |
| R1 = 13.461 | D1 = 0.295 | N1 = 1.80518 | ν1 = 25.4 |
| R2 = 5.429 | D2 = 1.182 | N2 = 1.62299 | ν2 = 58.2 |
| R3 = −18.874 | D3 = 0.014 | | |
| R4 = 4.934 | D4 = 0.655 | N3 = 1.62299 | ν3 = 58.2 |
| R5 = 14.628 | D5 = Variable | | |
| R6 = 25.996 | D6 = 0.109 | N4 = 1.83400 | ν4 = 37.2 |
| R7 = 1.715 | D7 = 0.382 | | |
| R8 = −1.948 | D8 = 0.091 | N5 = 1.78590 | ν5 = 44.2 |
| R9 = 1.592 | D9 = 0.409 | N6 = 1.84666 | ν6 = 23.9 |
| R10 = −8.193 | D10 = Variable | | |
| R11 = −2.973 | D11 = 0.118 | N7 = 1.713 | ν7 = 53.8 |
| R12 = 7.125 | D12 = 0.2 | N8 = 1.84666 | ν8 = 23.9 |
| R13 = −232.586 | D13 = Variable | | |
| R14 = 18.332 | D14 = 0.518 | N9 = 1.6968 | ν9 = 55.5 |
| R15 = −3.048 | D15 = 0.227 | | |
| R16 = 5.268 | D16 = 0.582 | N10 = 1.51633 | ν10 = 64.1 |
| R17 = −4.377 | D17 = 0.230 | | |
| R18 = −2.856 | D18 = 0.145 | N11 = 1.84666 | ν11 = 23.9 |
| R19 = −28.923 | D19 = 0.014 | | |
| R20 = 2.605 | D20 = 0.518 | N12 = 1.51633 | ν12 = 64.1 |
| R21 = 20.324 | D21 = 0.236 | | |
| R22 = 2.870 | D22 = 0.3 | N13 = 1.51633 | ν13 = 64.1 |
| R23 = 11.878 | D23 = 1.613 | | |
| R24 = 7.216 | D24 = 0.091 | N14 = 1.88300 | ν14 = 40.8 |
| R25 = 1.431 | D25 = 0.17 | | |
| R26 = 3.724 | D26 = 0.255 | N15 = 1.51742 | ν15 = 52.4 |
| R27 = −3.038 | D27 = 0.014 | | |
| R28 = 1.739 | D28 = 0.455 | N16 = 1.51742 | ν16 = 52.4 |
| R29 = 8.721 | D29 = 0.455 | | |
| R30 = ∞ | D30 = 0.545 | N17 = 1.51633 | ν17 = 64.1 |
| R31 = ∞ | | | |
| bf (Back Focus) = 0.675 | | Total Length = 16.074 | |
| A stop is positioned at a distance of 0.118 ahead R14. | | | |

-continued

Numerical Example 2
f = 1-11.455  FNO = 1.65  Image Angle 2ω = 53°-5°

| f   | 1     | 3.157 | 11.455 |
|-----|-------|-------|--------|
| D5  | 0.100 | 2.827 | 4.348  |
| D10 | 4.631 | 1.334 | 0.355  |
| D13 | 0.542 | 1.111 | 0.570  |

An exit pupil lies at a distance of −14.480 as measured from the image plane.

TABLE 1

The values of the factors in the conditions for the specific examples of the invention.

| Condition | Factor | Specific Example 1 | Specific Example 2 |
|-----------|--------|--------------------|--------------------|
| (1) | $\|R_{IV3}/R_{IV5}\|$ | 1.046 | 1.845 |
| (2) | $R_{IV7}/fw$ | 2.332 | 2.605 |
| (3) | $R_{IV9}/fw$ | 2.926 | 2.870 |
| (4) | $R_{IV12}/fw$ | 1.256 | 1.431 |
| (5) | $D_{IV4}/fw$ | 0.156 | 0.23 |
| (6) | $D_{IV8}/fw$ | 0.266 | 0.236 |
| (7) | $D_{IV10}/fw$ | 1.478 | 1.613 |
| (8) | $D_{IV12}/fw$ | 0.141 | 0.170 |

What I claim:

1. A zoom lens having four lens groups from front to rear; a first lens group of positive refractive power for focusing, a second lens group of negative refractive power having an image magnification varying function, a third lens group of negative refractive power for compensating for the shift of an image plane resulting from the change of the image magnification, and a fourth lens group of positive refractive power having an image forming function;

said fourth lens group having from front to rear a first component lens group and a second component lens group;

said first lens group having five lenses from front to rear including a first lens having a strong refracting surface at the image side thereof with both the lens surfaces being convex surfaces, a second lens having a strong refracting surface at the object side with both the surfaces being convex surfaces, a third lens of negative refractive power having a strong refracting surface at the object side, a fourth lens of positive refractive power having a strong refracting surface at the object side, and a fifth lens of positive refractive power having a strong refracting surface at the object side; and said second component lens group having three lenses from front to rear including a first lens of negative refractive power having a strong refracting surface at the image side, a second lens of positive refractive power having a strong refracting surface at the image side with both the lens surfaces being convex surfaces, and a third lens of positive refractive power having a strong refracting surface at the object side with both the lens surfaces being convex surfaces.

2. A zoom lens according to claim 1, satisfying the following conditions:

$0.9 < |R_{IV3}/R_{IV5}| < 1.9$ (where $R_{IV3} > 0$; $R_{IV5} < 0$)

$2.3 < R_{IV7}/fw < 2.7$ $2.7 < R_{IV9}/fw < 3.1$ $1.1 < R_{IV12}/fw < 1.6$ $0.14 < D_{IV4}/fw < 0.24$ $0.22 < D_{IV8}/fw < 0.27$ $1.4 < D_{IV10}/fw < 1.7$ $0.13 < D_{IV12}/fw < 0.18$ where $R_{IVi}$ is the radius of curvature of the i-th lens surface counting from front in said fourth lens group, $D_{IVi}$ is the i-th lens thickness or air separation, and fw is the shortest focal length of the entire system of said zoom lens.

* * * * *

UNITED STATES PATENT AND TRADEMARK OFFICE
CERTIFICATE OF CORRECTION

PATENT NO. : 4,518,228
DATED : May 21, 1985
INVENTOR(S) : Muneharu Sugiura

It is certified that error appears in the above-identified patent and that said Letters Patent is hereby corrected as shown below:

In the heading of the patent it should read:

-- [30] Foreign Application Priority Data

Oct. 15, 1982[JP] Japan ........... 57-181804 --

Signed and Sealed this

Twenty-first Day of January 1986

[SEAL]

Attest:

DONALD J. QUIGG

Attesting Officer

Commissioner of Patents and Trademarks